April 6, 1926. 1,579,868
W. F. KIESEL, JR
WATER LEVEL INDICATOR FOR TRAVELING BOILERS
Filed Oct. 21, 1920 3 Sheets-Sheet 1
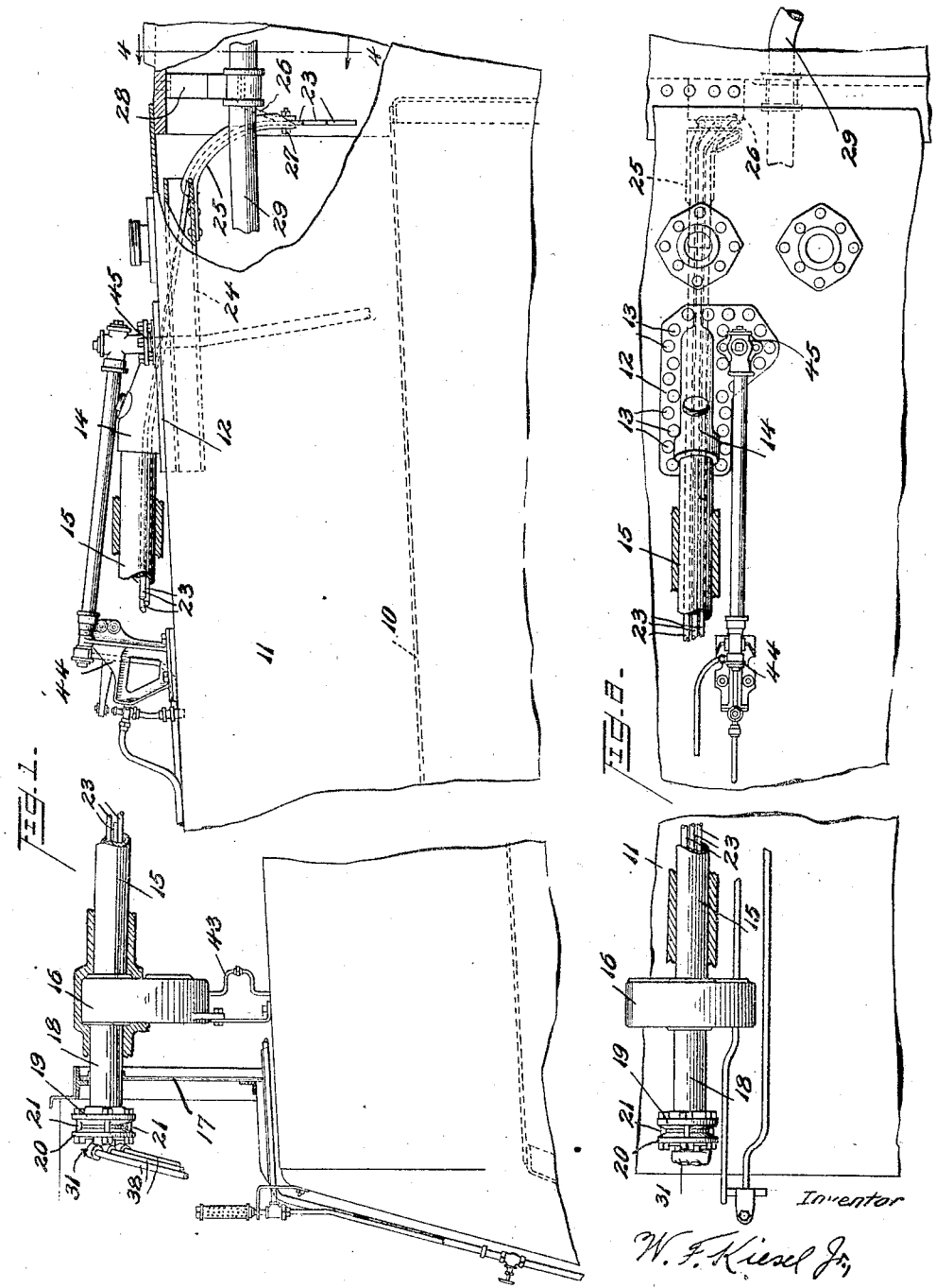

April 6, 1926.
W. F. KIESEL, JR
1,579,868
WATER LEVEL INDICATOR FOR TRAVELING BOILERS
Filed Oct. 21, 1920  3 Sheets-Sheet 2
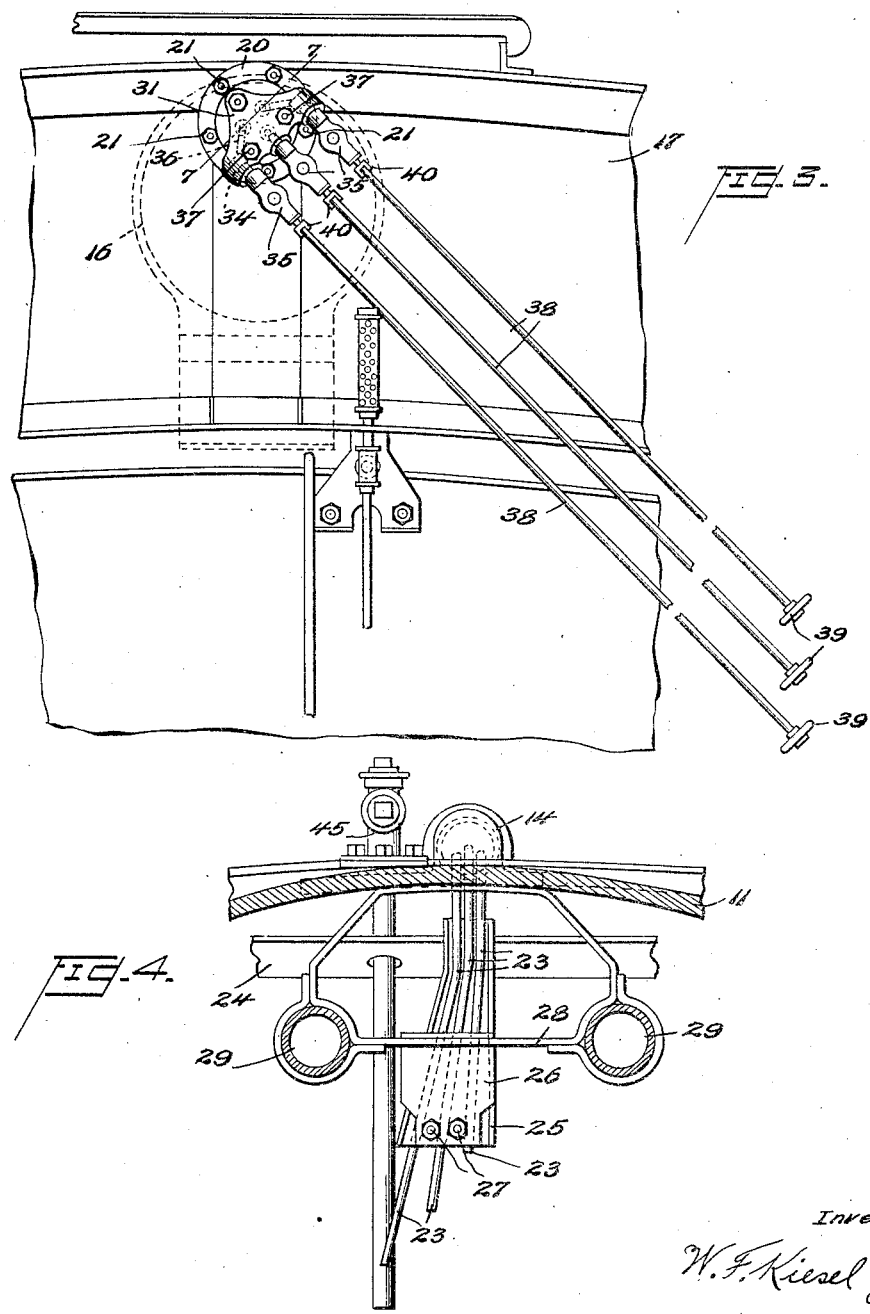

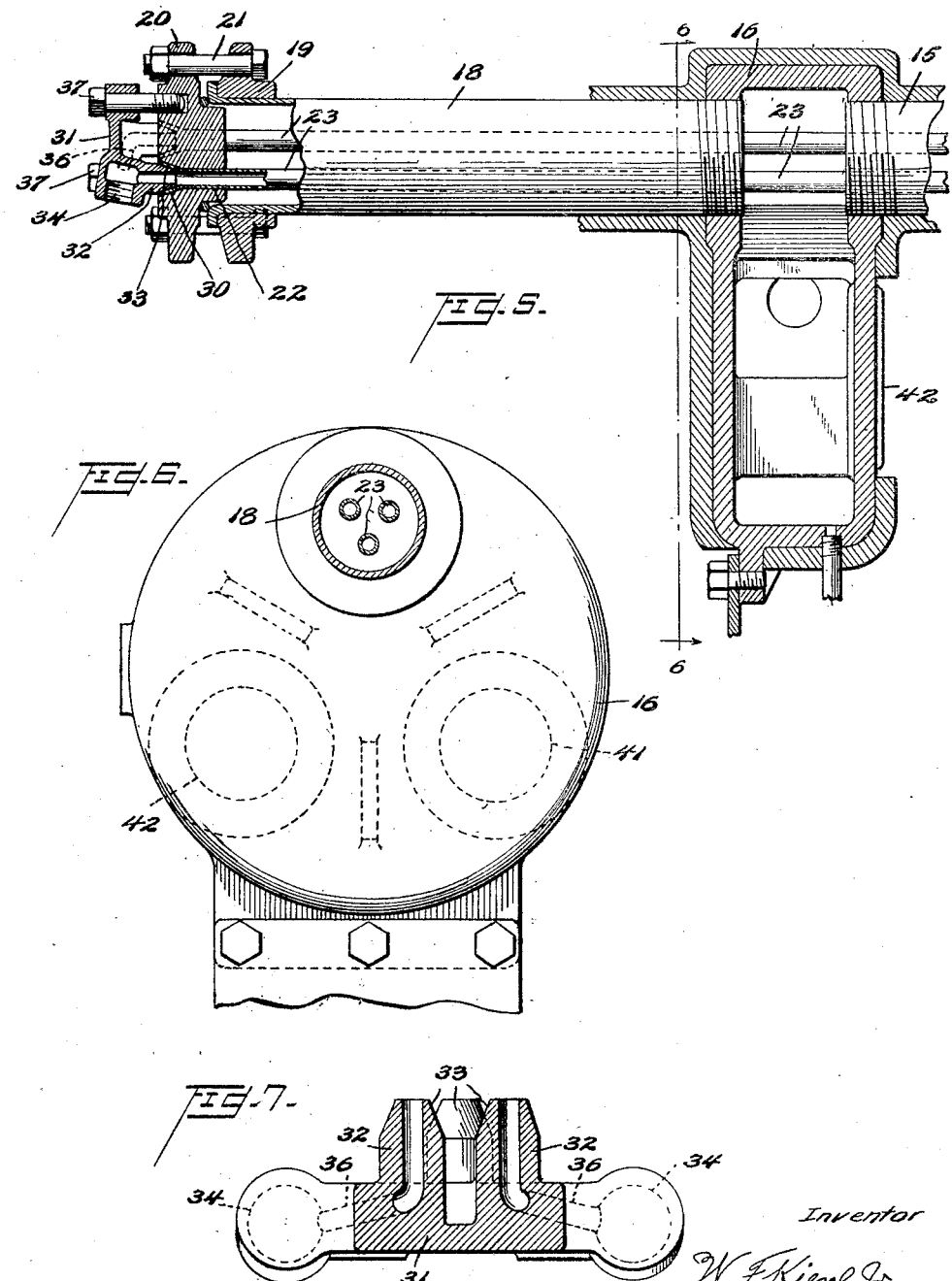

Patented Apr. 6, 1926.

1,579,868

UNITED STATES PATENT OFFICE.

WILLIAM F. KIESEL, JR., OF ALTOONA, PENNSYLVANIA.

WATER-LEVEL INDICATOR FOR TRAVELING BOILERS.

Application filed October 21, 1920. Serial No. 418,597.

*To all whom it may concern:*

Be it known that I, WILLIAM F. KIESEL, Jr., a citizen of the United States, and residing at Altoona, Blair County, State of Pennsylvania, have invented certain new and useful Improvements in Water-Level Indicators for Traveling Boilers, of which the following is a specification.

The present invention relates to traveling boilers and more particularly to means for correctly indicating the water level.

Where a boiler is subjected to tilting as in the case of locomotives, such means as gauge cocks or water glasses located in the cab and having communication with the interior of the boiler through the rear end thereof, are objectionable as they give misleading indications. When going up grade the gauge glass indicates plenty of water, whereas, the front end of the crown sheet may not be submerged at all. On the other hand, when going down grade, the glass may indicate a low water level, whereas, there is sufficient water in the boiler. The fluctuation shown by these old types of indicators is particularly emphasized in the present day long Mallet locomotives which are often twenty-five feet in length from the rear head to the front end of the combustion chamber.

In such a locomotive the change of water level indication on an ordinary gauge glass in going from a level to a two per cent grade is about six inches and from a two per cent up grade to a two per cent down grade about twelve inches. In order to give more accurate indications of the water level, it has been proposed to run pipes from the gauge cocks to about midway of the length of the boiler so that the cocks will indicate the level of water where there is the least fluctuation due to the inclination of the boiler. The present invention relates to an improved construction employing this principle.

The principal features of the present invention consist in the arrangement of the tubes extending to the gauge cocks so that they will drain into the boiler, thereby eliminating any false indications due to condensation in the tubes; the location of the gauge tubes so that they are partially outside of the boiler and jacketed with steam, this being accomplished by disposing the tubes in a pipe extending from the top of the boiler adjacent the front end of the crown sheet upwardly to the front wall of the cab above the boiler; the provision of means whereby the tubes at their cab ends may be opened and cleaned by a wire or similar means without removing the tubes, this result being attained by having the gauge cock stand removably secured to the closure of the cab end of the jacket pipe. Other objects and features of novelty will be apparent from the description taken in connection with the drawings in which, Fig. 1 is a side elevation of a portion of the rear part of a locomotive boiler, certain parts being broken away in order to show members otherwise hidden;

Fig. 2 is a top plan of the parts shown in Figure 1;

Fig. 3 is an elevation of part of the rear end of the boiler within the cab;

Fig. 4 is a sectional elevation taken substantially on the line 4—4 of Figure 1;

Fig. 5 is an enlarged sectional elevation of the rear end of the jacket or bridge pipe and the manifold;

Fig. 6 is a sectional elevation taken substantially on the line 6—6 of Figure 5; and Fig. 7 is a sectional view through the gauge stand taken substantially on the line 7—7 of Figure 3.

Referring to the drawings the numeral 10 indicates the crown sheet of a locomotive boiler 11. Adjacent the front end of the crown sheet or the central part of the boiler the shell of the boiler at the top thereof is provided with an opening which is closed by a plate 12 secured to the shell by rivets 13. As shown this plate is provided with a nozzle 14 which has communication with the interior of the boiler. A pipe 15 extends from the nozzle to a manifold 16 disposed above the boiler and in front of the front wall 17 of the cab. A short length of pipe 18 extends from the manifold through the front wall of the cab, this pipe 18 preferably being in alignment with the pipe 15. The rear end of the pipe 18 is provided with a flange 19 and a flanged member 20 forms a closure for this end of the pipe. The closure is secured to the flange 19 as by the bolts 21 and is provided with a plurality of apertures 22, there being three of these apertures in the present instance.

For the purpose of showing the water level adjacent the front end of the crown sheet or midway of the boiler, a plurality of tubes 23 extend from adjacent the front end of the crown sheet through the pipes 15 and 18 to the cab. As shown in Figures 1 and 4 the front ends of the tubes are disposed at different levels. In the form of the invention illustrated a baffle plate 24 is disposed below the plate 12 and a curved plate 25 is secured to the front end of the baffle plate and forms a support for the tubes 23. The front ends of the tubes are further secured in position by a plate 26, between which and the lower end of plate 25, the tubes are clamped by bolts 27. The plate 26 is mounted on a support 28 carrying the steam pipes 29. Preferably the pipes 15 and 18 are lagged so as to reduce condensation.

At their cab ends, the tubes 23 each extend into one of the openings 22 of the closure 20, these openings at their rear ends being flared to provide conical seats 30. A gauge cock stand 31 is provided with a plurality of hollow bosses 32, one for each of the tubes 23 and these bosses have beveled or conical ends 33 which engage within the ends of the tubes 23 and expand and clamp said ends against the seats 30 of the closure so that the tubes are tightly secured to the closure 20. The gauge stand is also formed to support the gauge cocks. As shown a plurality of threaded openings 34 are provided in the lower part of the stand and each of these openings has a gauge cock 35 secured therein. Each of the openings 34 is in communication with one of the bosses 32 through passages 36, these passages being independent of each other. The gauge stand is adapted to be removably secured to the closure 20 by the studs 37. Operating rods 38 having hand grips 39 at their lower ends are secured to the stems of the gauge cocks in any suitable manner, as indicated at 40, so that the cocks may be operated easily. The handles 39 are disposed at different levels corresponding to the levels of the front ends of the tubes 23.

The pipe 15 may be a bridge pipe for supplying steam to the auxiliaries at the rear end of the boiler. Thus the manifold 16 is provided with openings 41 and 42 adapted to be placed in communication with the auxiliaries. A pipe 43 may be provided to drain the manifold into the boiler.

A low level alarm 44 is shown in the drawings, but constitutes no part of the present invention. It has communication with the interior of the boiler through a nozzle 45 on the plate 12.

From the foregoing description it will be seen that the gauge cocks will give accurate indications of the water level, as they are in communication through the tubes 23 with the interior of the boiler at the front end of the crown sheet or substantially midway of the length of the boiler. Furthermore because of the inclination of the tubes from the cab downwardly into the boiler, any condensation of steam in the tubes will drain into the boiler and no false indications will be given because of any condensation. The rear or cab ends of the tubes have a steam-tight joint with the pipe closure 20, and the gauge stand 31 if desired can be removed so that a wire or other cleaning device may be inserted through the rear ends of the tubes to clean the same.

Having thus described the invention what is claimed as new and desired to be secured by Letters Patent is:

1. The combination with a traveling boiler having a cab, of means for indicating the water level, including a conduit outside the boiler having communication at one end with the interior of the boiler adjacent the central part of its length, its other end being closed and projecting into the cab, a plurality of tubes in said conduit having communication through said closed end each with a gauge cock, and the other ends extending into the boiler and terminating at different elevations.

2. The combination with a traveling boiler having a cab, of means for indicating the water level, including a conduit outside the boiler having communication at one end with the interior of the boiler adjacent the central part of its length, its other end being closed and projecting into the cab, a plurality of tubes in said conduit having communication through said closed end each with a gauge cock, and the other ends extending into the boiler and terminating at different elevations, said tubes being disposed to drain through the latter ends.

3. The combination with a traveling boiler having a cab, of means for indicating the water level, including a conduit outside the boiler having communication at one end with the interior of the boiler adjacent the central part of its length, its other end being closed and projecting into the cab, a plurality of tubes in said conduit having communication through said closed end each with a gauge cock, and the other ends extending into the boiler and terminating at different elevations, said conduit being inclined downwardly from the cab end, whereby the tubes drain into the boiler.

4. The combination with a traveling boiler having a cab, of means for indicating the water level including a pipe having communication at one end with the interior of the boiler through the top thereof and adjacent the central part of its length, its other end being closed and projecting into the cab, a plurality of tubes in said pipe having communication at said closed end each with a gauge cock, and the other ends extending into the boiler and terminating at different elevations, said pipe being inclined downwardly from the cab end whereby said tubes drain into the boiler.

5. The combination with a traveling boiler having a cab, of means for determining the water level including gauge cocks disposed above the rear end of the boiler within the cab, tubes extending from said cocks to the interior of the boiler terminating at different elevations substantially midway of the length thereof, and means jacketing said tubes with steam from the boiler.

6. The combination with a traveling boiler having a cab, of means for determining the water level, including gauge cocks disposed above the rear end of the boiler within the cab, tubes extending from said cocks to the interior of the boiler terminating at different elevations substantially midway of the length thereof, said tubes being continuously inclined downwardly from their cab ends to their boiler ends.

7. The combination with a traveling boiler having a cab, of means for determining the water level, including gauge cocks disposed above the rear end of the boiler within the cab, a bridge pipe outside the boiler, and tubes in said pipe extending from said cocks to the interior of the boiler terminating at different elevations substantially midway of the length of the boiler.

8. The combination with a traveling boiler having a cab, of means for means for determining the water level, including a plate secured to the top of the boiler adjacent the central part of its length and having a nozzle, a pipe extending from said nozzle into the cab being inclined upwardly from said nozzle to its cab end, and tubes in said pipe terminating at different elevations within the boiler substantially midway of its length, the other ends of said tubes being in communication each with a gauge cock within the cab.

9. Apparatus of the character described including in combination, a pipe having a closure secured to an end thereof formed with a plurality of circular openings therethrough flared outwardly at their outer ends to provide conical seats, tubes in said pipe each expanded at an end to fit one of said seats, a gauge cock stand secured to said closure and having a plurality of conical bosses adapted to fit in the expanded ends of the tubes and clamp the same, and a plurality of gauge cocks mounted on said stand, each in communication with a tube through one of said bosses.

10. As an article of manufacture, a gauge cock stand comprising a member having a plurality of hollow bosses formed with tapered ends, and a like number of threaded openings for the gauge cocks, said member also formed with passages affording communication between the bosses and openings said passages being independent of each other.

In testimony whereof I affix my signature.

WILLIAM F. KIESEL Jr.